(12) United States Patent
Harris, Jr. et al.

(10) Patent No.: US 7,201,099 B2
(45) Date of Patent: Apr. 10, 2007

(54) DEVICE AND SYSTEM FOR MONITORING FOOD

(75) Inventors: Kenneth David Harris, Jr., Hollis, NH (US); Charles J. Burout, III, Bedford, NH (US); Steven Schwartz, Bedford, NH (US); M. Rufus Woodard, Boston, MA (US)

(73) Assignee: Brookstone Purchasing, Inc., Merrimack, NH (US)

( * ) Notice: Subject to any disclaimer, the term of this patent is extended or adjusted under 35 U.S.C. 154(b) by 384 days.

(21) Appl. No.: 10/811,109

(22) Filed: Mar. 26, 2004

(65) Prior Publication Data

US 2005/0211104 A1    Sep. 29, 2005

(51) Int. Cl.
*A47J 43/28* (2006.01)
(52) U.S. Cl. .......................................... 99/342
(58) Field of Classification Search ............... 374/155, 374/141; 340/870.16; 99/342, 343, 344
See application file for complete search history.

(56) References Cited

U.S. PATENT DOCUMENTS

| | | | |
|---|---|---|---|
| 4,278,841 A * | 7/1981 | Regennitter et al. ......... 379/40 |
| 4,377,733 A | 3/1983 | Yamaguchi et al. |
| 4,471,354 A | 9/1984 | Smith |
| 4,475,024 A | 10/1984 | Tateda |
| 4,716,411 A | 12/1987 | Nakamura |
| 5,938,619 A | 8/1999 | Dogre |
| 5,964,517 A | 10/1999 | Adams |
| 5,983,783 A | 11/1999 | Archard et al. |
| 6,000,845 A | 12/1999 | Tymkewicz et al. |
| 6,043,461 A | 3/2000 | Holling et al. |
| 6,046,674 A | 4/2000 | Irwin et al. |
| 6,065,391 A | 5/2000 | Archard et al. |
| 6,080,972 A | 6/2000 | May |
| 6,238,354 B1 | 5/2001 | Alvarez |
| 6,300,871 B1 | 10/2001 | Irwin et al. |
| 6,412,398 B1 | 7/2002 | Norcross et al. |
| 6,501,384 B2 | 12/2002 | Chapman et al. |
| 6,501,834 B1 | 12/2002 | Milewski et al. |
| 6,539,842 B1 | 4/2003 | Chapman et al. |
| 6,547,745 B1 * | 4/2003 | Rubinstein .................. 600/549 |
| 6,568,848 B1 | 5/2003 | Chapman et al. |
| 6,591,739 B2 | 7/2003 | Norcross |
| 6,712,505 B2 | 3/2004 | Chapman et al. |
| 6,759,635 B2 | 7/2004 | Lile |
| 6,811,308 B2 | 11/2004 | Chapman et al. |
| 6,817,757 B1 * | 11/2004 | Wallace ..................... 374/120 |
| 6,937,148 B2 | 8/2005 | Irwin |
| 2005/0157775 A1 | 7/2005 | Chapman |
| 2005/0261991 A1 * | 11/2005 | Kennamer .................. 705/28 |

* cited by examiner

*Primary Examiner*—Timothy Edwards, Jr.
(74) *Attorney, Agent, or Firm*—Nixon Peabody, LLP

(57) ABSTRACT

A device and system for monitoring food is described. The food monitoring device has a temperature sensor and a temperature sensor base. The temperature sensor base has a transmitter and a microphone. The temperature sensor base is electrically coupled to the temperature sensor. A monitor having a speaker and a receiver communicates with the transmitter of the temperature sensor base. The transmitter of the temperature sensor base transmits a temperature sensed by the temperature sensor and an audio signal produced by the microphone.

23 Claims, 9 Drawing Sheets

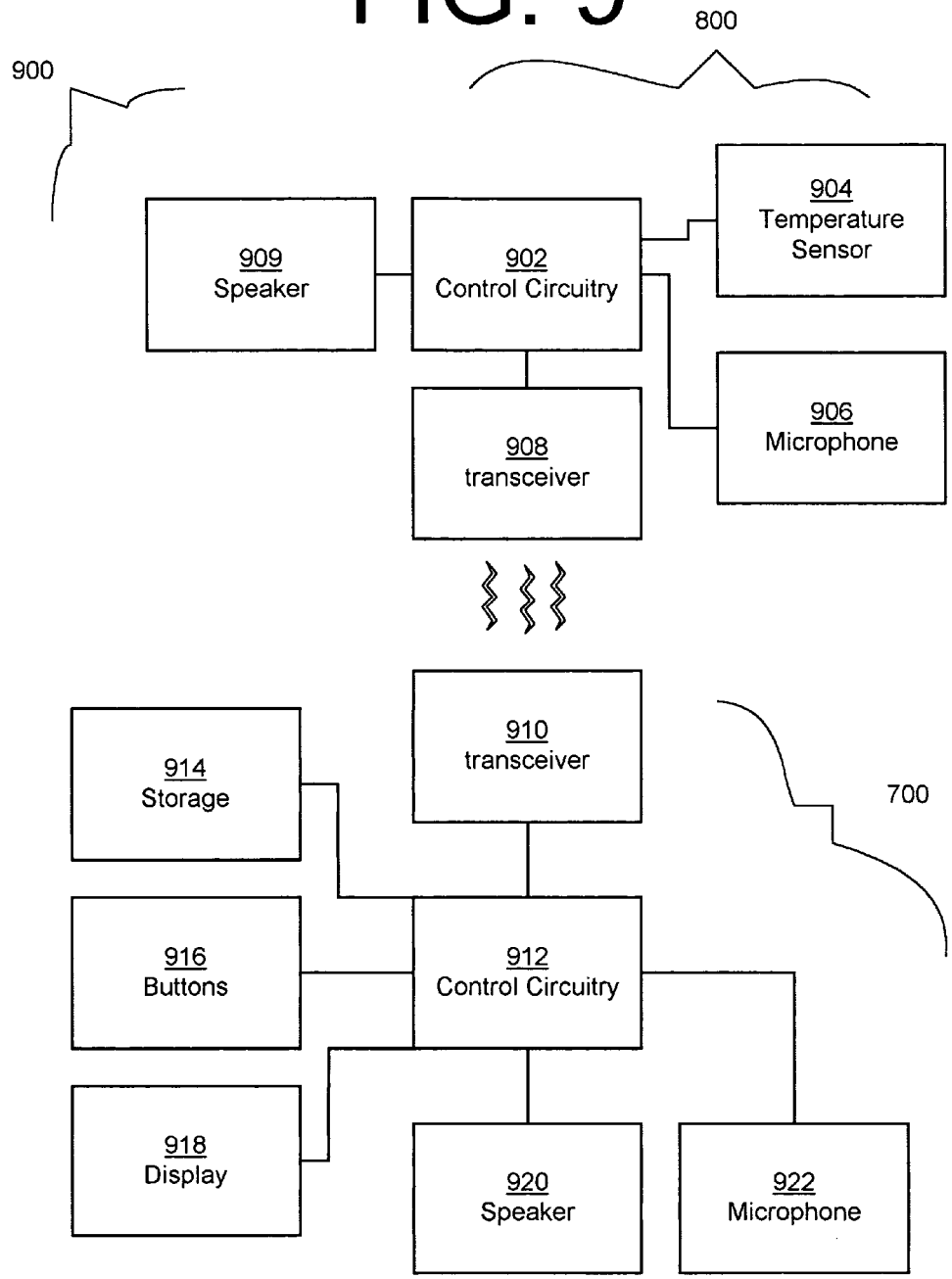

DEVICE AND SYSTEM FOR MONITORING FOOD

FIELD OF THE INVENTION

The present invention is generally related to a food monitoring device and system, and more particularly is related to a remote intercom device for monitoring food.

BACKGROUND OF THE INVENTION

Various food products can be prepared or cooked in accordance with taste preference of an individual. Meat items, in particular, are cooked to the taste preference of a specific person. Such meat items may include steaks, pork chops, hamburger patties, roasts, racks and the like. For some such meat items, including beef, veal, and lamb, a cooking selection often is made from known taste preferences or health requirements, including rare, medium rare, medium, medium well, and well done.

Food thermometers have been used to indicate the amount that a food product is cooked, referred to herein as its "doneness." Most of these food thermometers incorporate a probe that is inserted into the food. The probe communicates with a temperature-measuring device. In certain food thermometers, the user must insert the probe into the food item prior to, or in the early stages of cooking, particularly when the food is being cooked in an enclosed oven, grill or the like.

Many food thermometers provide a direct reading of the temperature of the cooking food at the location of the probe. With this approach, the user is required to be aware of the significance of the food temperature insofar as it correlates to the extent of doneness that is desired or required for a particular type of meat, or other food item. Most individuals are entirely unaware as to what temperature the interior of a chicken breast, for instance, needs to be cooked, instead relying on an interior or exterior color of the cooking food. A device is needed that can provide not only the temperature of cooking food, but also the level of doneness of the food.

Food thermometers further limit the mobility of a user. In order to prevent over-cooking the food item, the user may need to observe the thermometer constantly or calculate the amount of time until the user is required to recheck the thermometer. This limits mobility of the user to a range needed to observe the thermometer and requires knowledge by the user of the speed at which the food is cooking.

Thus, a heretofore-unaddressed need exists in the industry to address the aforementioned deficiencies and inadequacies.

SUMMARY OF THE INVENTION

In one aspect, the food monitoring device has a temperature sensor and a temperature sensor base. The temperature sensor base has a transmitter and a microphone. The temperature sensor base is electrically coupled to the temperature sensor. A monitor having a speaker and a receiver communicates with the transmitter of the temperature sensor base. The transmitter of the temperature sensor base transmits a temperature sensed by the temperature sensor and an audio signal produced by the microphone.

In another aspect, the food monitoring device also has a temperature sensor base with a receiver and a speaker. The monitor also has a transmitter and a microphone. The transmitter of the monitor transmits an audio signal produced by the microphone of the monitor to the receiver of the temperature sensor base. The temperature sensor base broadcasts the audio signal over the speaker of the temperature sensor base.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a block diagram illustrating the interaction of components of food monitoring assembly in accordance with the second exemplary embodiment of the invention.

DETAILED DESCRIPTION

Figure 1:
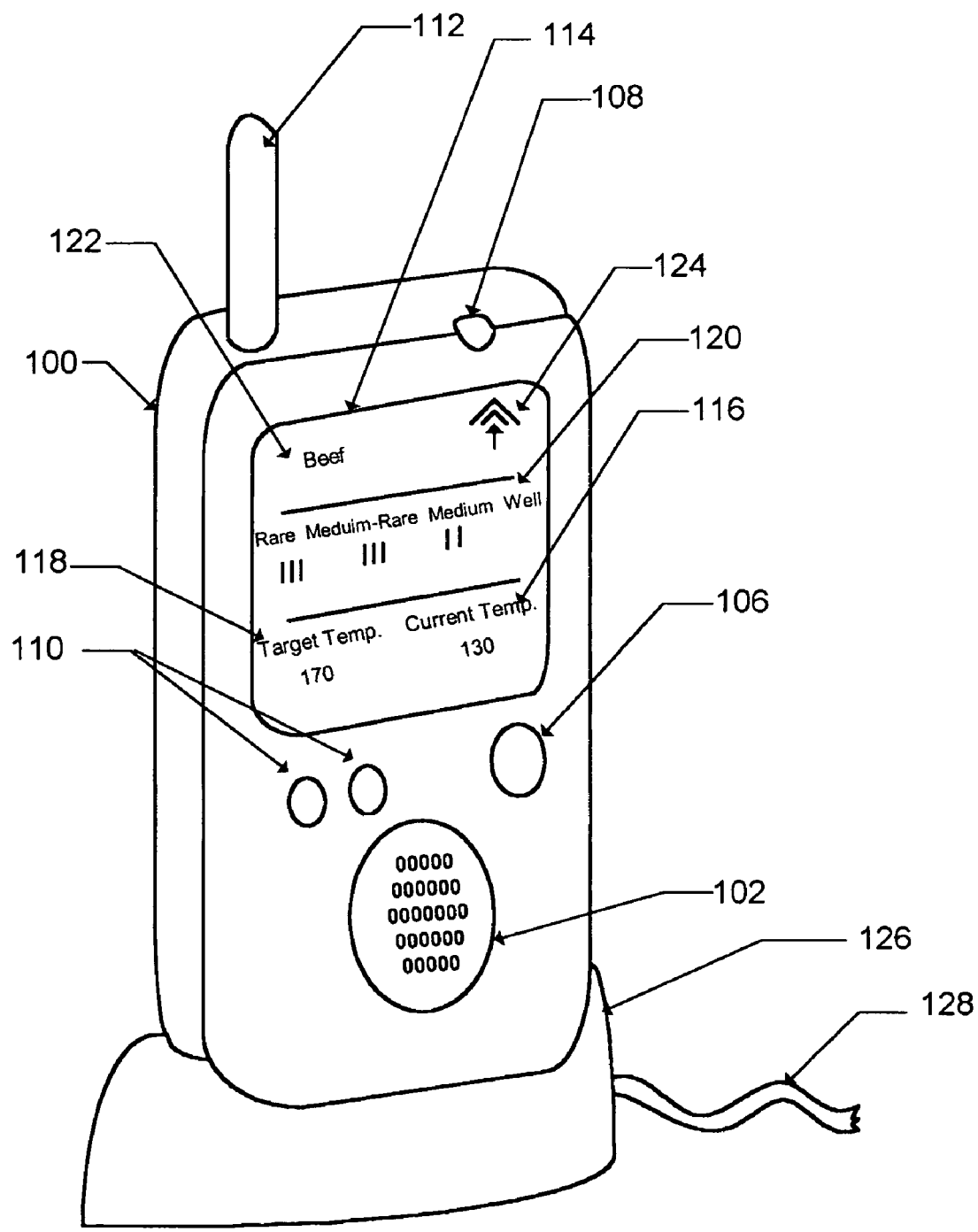
FIG. 1 is a perspective view of a monitor, in accordance with a first exemplary embodiment of the invention.
Figure 2:
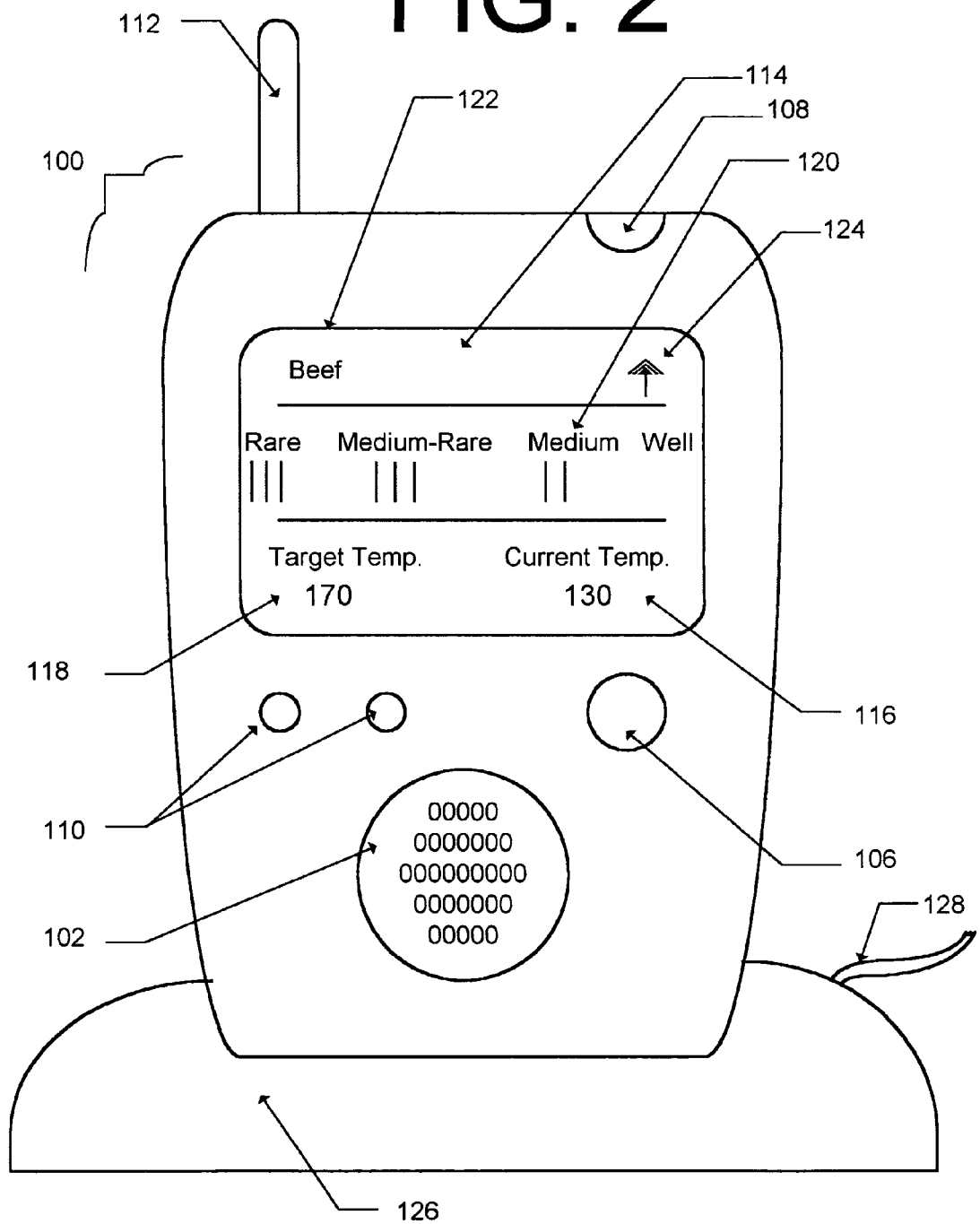
FIG. 2 is a front view of the monitor of FIG. 1.
Figure 3:
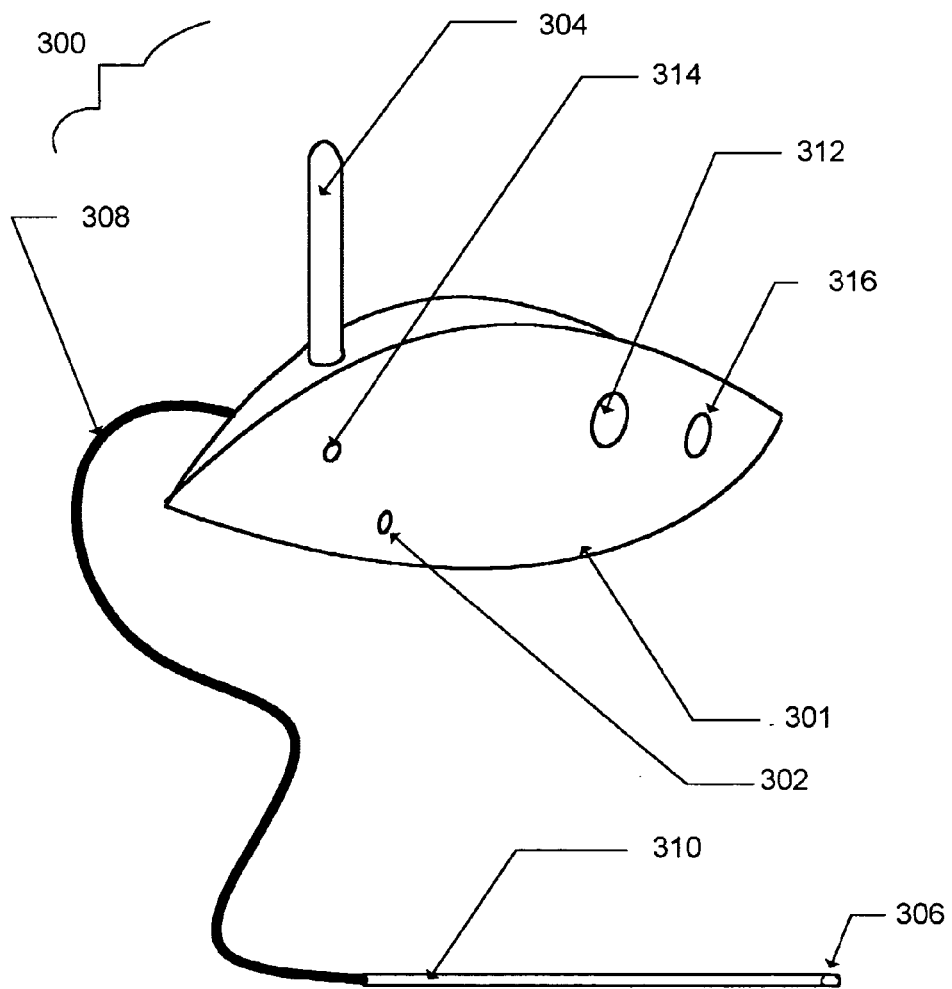
FIG. 3 is a perspective view of a temperature sensor assembly, in accordance with the first exemplary embodiment of the invention.
Figure 4:
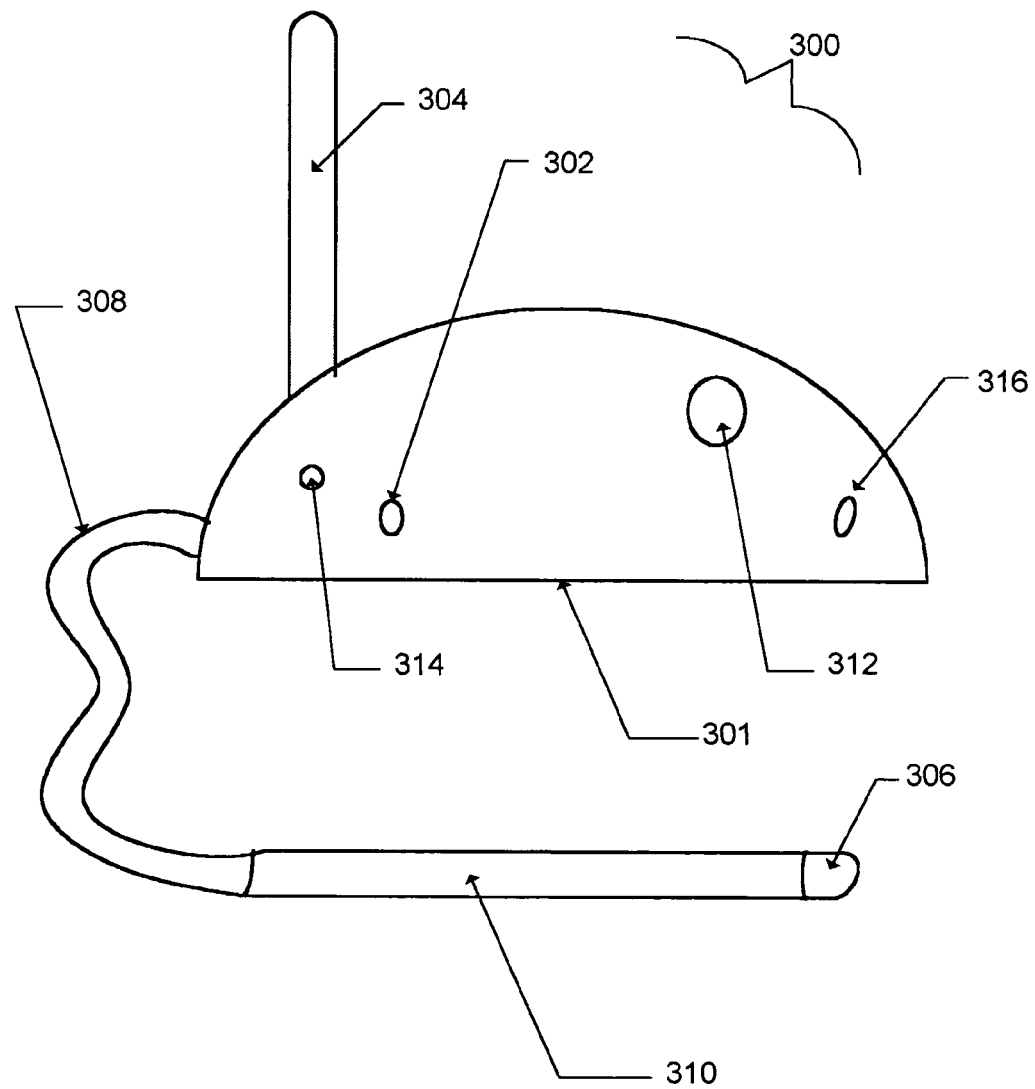
FIG. 4 is a front view of the temperature sensor assembly of FIG. 3.

FIG. 1 is a perspective view and FIG. 2 is a front view of a monitor 100. FIG. 3 is a perspective view and FIG. 4 is a front view of a temperature sensor assembly 300. The temperature sensor assembly 300 measures a temperature of a food item and transmits the measured temperature to the monitor 100. In accordance with the first exemplary embodiment, the temperature sensor assembly 300 has a microphone 302 for receiving audio signals. In addition, the temperature sensor assembly is capable of transmitting an audio signal to the monitor 100 for broadcast by a speaker 102 of the monitor 100.

The monitor 100 can have a display 114 and a speaker 102 for communicating with the user. The speaker 102 can be used to broadcast an alarm or a pre-recorded audio segment pertaining to the progress of the food items as will be discussed herein. The speaker 102 can also be used to broadcast audio received by the microphone 302 on the temperature sensor assembly 300. The display 114 can visually communicate to the user the status of the food item and allow the user to operate the different cooking functions of the monitor 100, as will be discussed herein. The display 114 can be a liquid crystal display (LCD) technology or other display technologies known to those having ordinary skill in the art.

A user can operate the monitor 100 by pressing various buttons located on the surface of the monitor 100. A power button 106 located on the front allows a user to turn the monitor 100 to an "on" state or an "off" state. Alternatively, other known technologies may be used to turn the monitor 100 to the "on" state or "off" state. As an example, the monitor 100 may turn on when the display 114 is touched or, if the monitor 100 has a microphone therein, when sound is detected. A display button 108 located on the top edge of the monitor 100 allows the user to activate a display backlight (not shown). The display backlight provides better visibility of the display 114 when the user is viewing the display 114 under low light environments. Two scroll buttons 110 located below the display 114 allow the user to scroll through menus presented on the display 114. The various buttons described above can be located in a variety of different locations and surfaces on the monitor 100. The monitor 100 is not limited to the above-described buttons. Along with the above-described buttons, various other buttons can be provided to allow the user to operate the monitor. In addition, one scroll button may be provided, instead of two.

The monitor 100 has an antenna 112 for receiving wireless transmissions from the temperature sensor assembly 300. The antenna 112 of the monitor 100 receives the wireless transmissions and converts them to a guided electrical signal within a wire, which in turn is fed to the control circuitry 612 (FIG. 6) of the monitor 100. The control circuitry 612 (FIG. 6) is described in greater detail in the specification associated with FIG. 6. The antenna 112 of the monitor 100 receives wireless transmissions from an antenna 304 located on the temperature sensor assembly 300. In an exemplary embodiment described above, the antenna 304 of the temperature sensor assembly 300 can transmit to the antenna 112 of the monitor 100 at a distance of about three hundred (300) feet, however, different transmitters and receivers can be provided to increase or decrease the transmission distance.

Referring specifically to FIG. 3 and FIG. 4, the temperature sensor assembly 300 measures the temperature of a food item and transmits the measured temperature to the monitor 100. The temperature sensor assembly 300 also has the ability to transmit audio signals to the monitor 100 for broadcast by the speaker 102 of the monitor 100. A temperature sensor 306 is coupled to a temperature sensor base 301 by a cable 308. The temperature sensor 306 is integrated within a piercing element 310. The piercing element 310 is designed for insertion into food and made of a metal or other material that provides structure and thermal conductivity. The temperature sensor 306 can be a thermocouple or other device that changes current or voltage as temperature increases or decreases. The cable 308 transmits the change in current or voltage back to the control circuitry 602 (FIG. 6) of the temperature sensor assembly 300. The control circuitry 602 (FIG. 6) of the temperature sensor assembly 300 is described in greater detail in the specification associated with FIG. 6. The control circuitry 602 (FIG. 6) then transmits the change in current or voltage to the antenna 304 for wireless transmission to the monitor 100.

The power to operate the temperature sensor assembly 300 can be provided by a power source located within the temperature sensor base 301, for example one or more batteries. The power can also be provided by a utility plug (not shown) that plugs into a utility outlet or other source of power and supplies power to the temperature sensor assembly 300. A power button 312 can be located on the surface of the temperature sensor base 301. The power button 312 allows a user to turn the temperature sensor assembly 300 "on" and "off." The temperature sensor base 301 can also have a power status light emitting diode (LED) 314 to communicate the current state to the user, i.e. the LED is illuminated when the temperature sensor assembly 300 is "on" and is not illuminated when the temperature sensor assembly 300 is "off." In addition, the temperature sensor base 301 can also have a variety of other status LEDs to communicate to a user, for example but not limited to, a transmission LED (not shown) that communicates whether the temperature sensor assembly 300 is transmitting, or a monitor range LED (not shown) that communicates when the monitor 100 is out of transmission range of the temperature sensor assembly 300.

The temperature sensor assembly 300 has a microphone 302 located on the surface of the temperature sensor base 301. A microphone key button 316 allows the user to operate the microphone 302. The user operates the microphone 302 by pressing the microphone key button 316 and speaking into the microphone 302. The speech of the user is converted into an audio signal that is transmitted to the antenna 304 for wireless transmission. The audio signal is then transmitted wirelessly to the antenna 112 of the monitor 100. The monitor 100 broadcasts the audio signal out of the speaker 102 located on the surface of the monitor 100. This allows the user located near the temperature sensor assembly 300 to communicate to an individual near or within hearing distance of the monitor 100.

Referring back to FIG. 2, the display 114 of the monitor 100 may be configured in many different types of designs. One design of the display 114 is configured to show a current temperature 116 of a pierced food item and a target temperature 118 of the pierced food item. Another design of the display 114 may contain a doneness scale 120. A third design of the display 114 may show the type of food item 122 being monitored. A forth design may show a reception icon 124 to indicate that the monitor 100 is within reception distance of the temperature sensor assembly 300. Many variations and modifications may be made to the above-described designs without departing substantially from the spirit and principles of the invention. For example, the above designs may be displayed in combination, individually, or combined with other designs not discussed.

One possible feature of the display 114 is the doneness scale 120, as shown in FIGS. 1 and 2. In one design of the doneness scale 120, categories of rare, medium rare, medium and well done are available. Each doneness scale category is associated with a temperature range, as well as a bar in the display 114. When the temperature sensor 306 in the food item senses a temperature, the temperature is compared to the temperature ranges associated with each doneness scale category. Preferably, the temperature ranges are stored within a storage device 614 (FIG. 6) located within the monitor 100. Once a category corresponding to the temperature range for the sensed temperature is determined, the bar or icon for that category of doneness is displayed. The temperature ranges may be different for different types of food. In one design of the doneness scale 120, any of nine different entree choices may be selected for doneness measurement. Examples of entree choices may include but are not limited to beef, fish, pork, chicken, turkey, and lamb.

FIGS. 1 and 2 show one design of the doneness chart 120 within the display 114. In the display 114, one food item 122 of nine possible food items is shown by name. The selector buttons 110 are used to scroll through each of the nine items, which are displayed as they are selected. When a user wishes to select a food item, the user simply presses one of the selector buttons 110, scrolling through the food items, until the food item the user wishes to select is displayed. After a predetermined period of time, the displayed food item 122 automatically becomes the selected food item. Alternatively, the user may select the illuminated food item 122 by pressing the selector button 228 a second time. In the display 114 shown in FIGS. 1 and 2, the food item 122 selected is "Beef".

The doneness chart 120 contains four terms—Rare, Medium-Rare, Medium, and Well—corresponding to four doneness levels. Three bars can be displayed below each of the four terms, each bar corresponding to an incremental level of the associated doneness level. When the temperature sensor 306 is inserted into a selected food item, the temperature sensor 306 detects the temperature and that sensed temperature information is sent to the monitor 100. The sensed temperature is compared by control circuitry 612 (FIG. 6) of the monitor 100 to a doneness table, such as Table I shown below for beef. The appropriate bar on the doneness chart 120 is displayed. Different food items (e.g., chicken, pork) have different temperature ranges associated with the doneness levels. Many variations and modifications may be made to the above-described doneness chart 120 design without departing substantially from the spirit and principles of the doneness chart 120 and the invention.

TABLE I

Beef Doneness Chart

| Doneness | Light | Temperature Range (° F.) |
| --- | --- | --- |
| Rare | First bar | 0–124 |
| Rare | Second bar | 125–127 |
| Rare | Third bar | 128–129 |
| Medium-Rare | First bar | 130–134 |
| Medium-Rare | Second bar | 135–137 |
| Medium-Rare | Third bar | 138–139 |
| Medium | First bar | 140–144 |
| Medium | Second bar | 145–149 |
| Medium | Third bar | 150–154 |
| Well | First bar | 155–159 |
| Well | Second bar | 160–165 |
| Well | Third bar | 166–170 |

Figure 5:
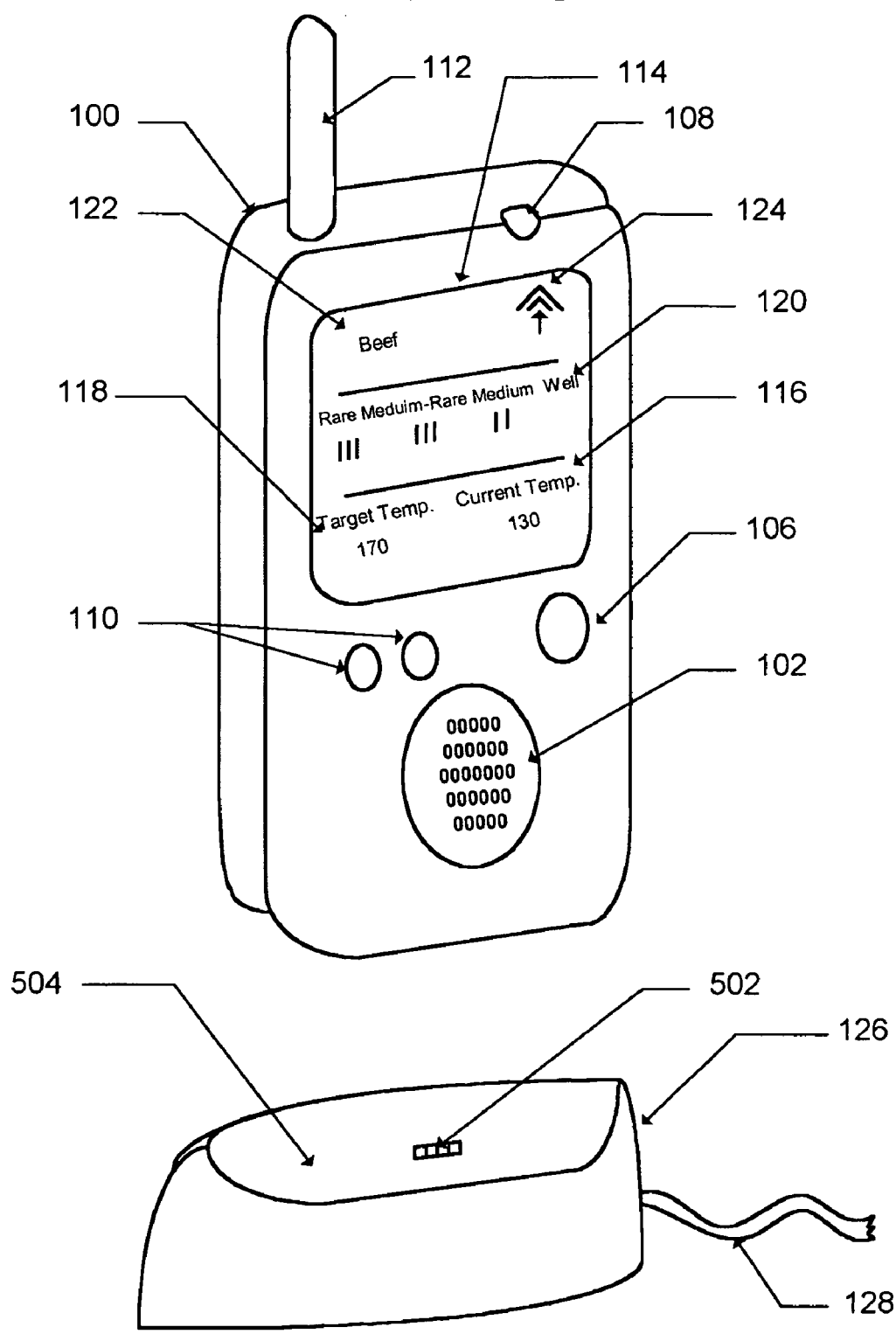
FIG. 5 is a perspective view of the monitor detached from a monitor cradle, in accordance with a first exemplary embodiment of the invention.

A monitor cradle 126 can be provided to hold the monitor 100 in an upright position as shown in FIGS. 1 and 2. The monitor cradle 126 can be used to hold the monitor 100 on a table or countertop allowing the hands of the user to be free for other food preparation tasks. The upright position allows user to easily view the display 114. In addition to holding the monitor 100, the monitor cradle 126 can also be used as a docking station to supply power to a rechargeable power source within the monitor 100. FIG. 5 shows the monitor cradle 126 detached from the monitor 100. A power cord 128 supplies power from a power source, such as a utility outlet, to the monitor cradle 126. The power cord 128 is electrically coupled to electrical leads 502 located within a pocket 504 of the monitor cradle 126. When the monitor 100 is placed in the pocket 504 of the monitor cradle 126, the electrical leads 502 are coupled to a second set of electrical leads (not shown) located on the bottom of the monitor 100. The electrical leads 502 allow current to flow to the rechargeable power source within the monitor 100 and recharge the rechargeable power source. Once the rechargeable power source is recharged, the monitor 100 may be removed from the monitor cradle 126 for mobile use. The monitor 100 is not limited to using a rechargeable power source. The monitor 100 can also be implemented with non-rechargeable batteries or a power cord.

When a user desires to be mobile, the user can remove the monitor 100 from the monitor cradle 126. The monitor 100 can also incorporate a variety of coupling devices for attaching to a user (not shown), for example but not limited to clips, fasteners, handles, or straps. The monitor 100 can be coupled to the user or an article of clothing on the user. The user is then free to travel away from the temperature sensor assembly 300, while still monitoring the cooking progress of the food item.

Figure 6:
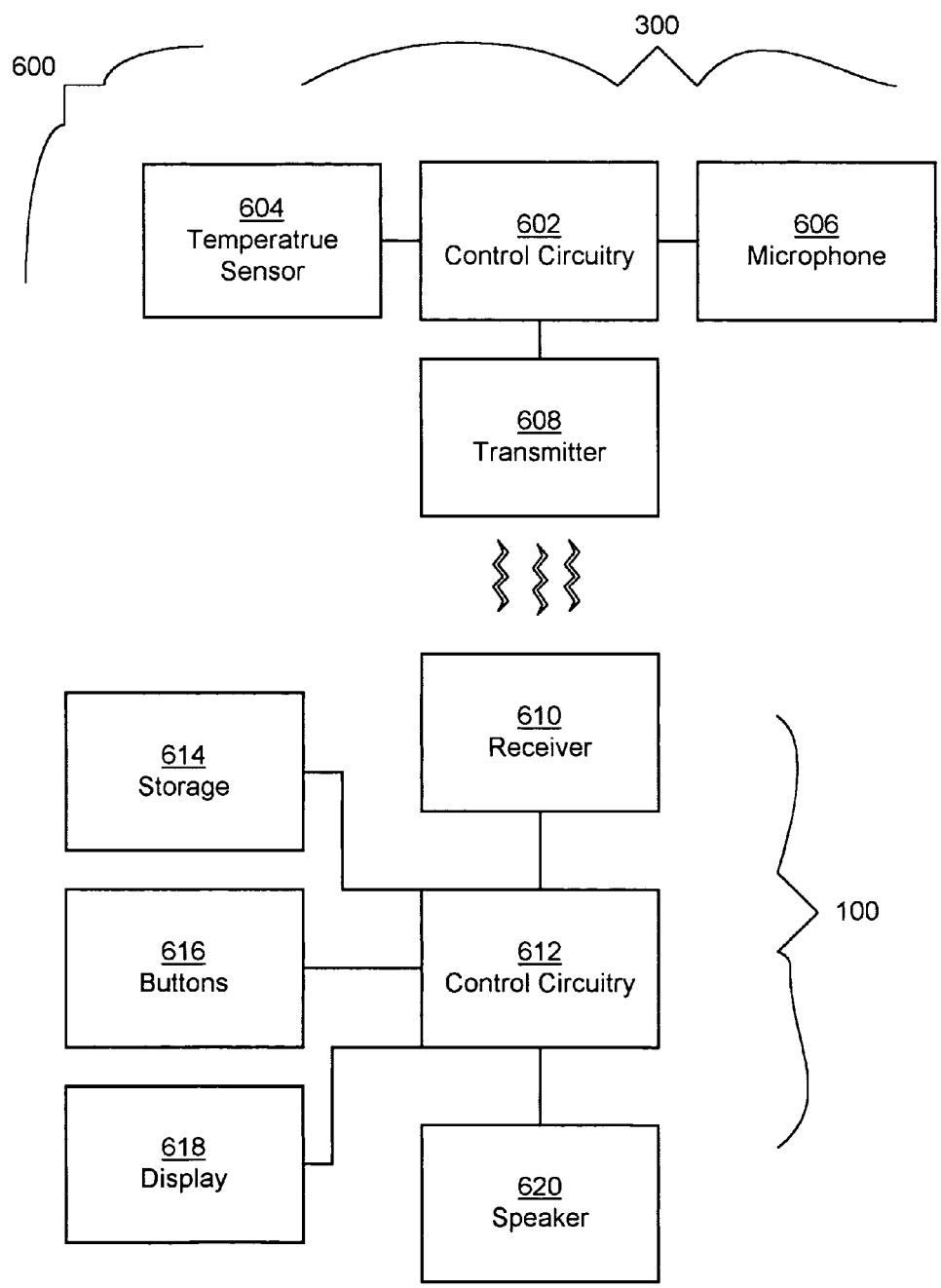
FIG. 6 is a block diagram illustrating the interaction of components of a food monitoring assembly, in accordance with the first exemplary embodiment of the invention.

FIG. 6 is a block diagram illustrating interaction of components of a food monitoring assembly 600, containing the temperature sensor assembly 300 and monitor 100, in accordance with the first exemplary embodiment of the invention. The control circuitry 602 of the temperature sensor assembly 300 receives signals from the temperature sensor 604 and the microphone 606. The control circuitry 602 transmits the received signals to a transmitter 608 that transmits the signals via the antenna 304 of the temperature sensor assembly 300. The transmitter 608 can transmit the received signals at the same frequency or at multiple frequencies. For example, the transmitter 608 can transmit audio signals at a specific frequency and transmit temperature data signals at another frequency. The wireless signals are broadcasted from the antenna 304 of the temperature sensor assembly 300 and are received by the antenna 112 of the monitor 100. The receiver 610 of the monitor 100 transmits the signals to the control circuitry 612 of the monitor 100.

The control circuitry 612, 602 of both the monitor 100 and the temperature sensor assembly 300 may be implemented entirely in hardware. The control circuitry 612, 602 can be implemented with one or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field programmable gate array (FPGA), etc. In an alternative embodiment (not shown), the control circuitry 612, 602 can be implemented via software on a general processor. The monitor 100 may have a storage device 614 and peripheral devices. In the above exemplary embodiment, the peripheral devices may include a variety of buttons 616 and a display 618. However, the peripheral devices in alternative embodiments may include touch screens, keyboards, and/or scanners. The storage device 614 may be any nonvolatile memory element (e.g., ROM, hard drive, tape, CDROM, etc.).

The control circuitry 612 of the monitor 100 transmits the audio signals received from the receiver 610 to the speaker 620. The speaker 620 broadcasts the received audio signal to the user. When the control circuitry 612 of the monitor 100 receives information concerning the temperature of the food item, the control circuitry 612 compares the temperature of the food item with a stored doneness chart that is specific to the food item selected by the user. The different doneness charts are stored in the storage device 614 of the monitor 100. The control circuitry 612 determines the current temperature range of the food item 122. The control circuitry 612 of the monitor 100 displays the specified number of bars for the identified range. In addition to storing the various doneness charts, the storage device 614 of the monitor 100 can be used to store various temperature settings and alarms.

For example, the monitor 100 can be set to sound an audible or visual alarm when the food item has reached a specified temperature.

Figure 7:
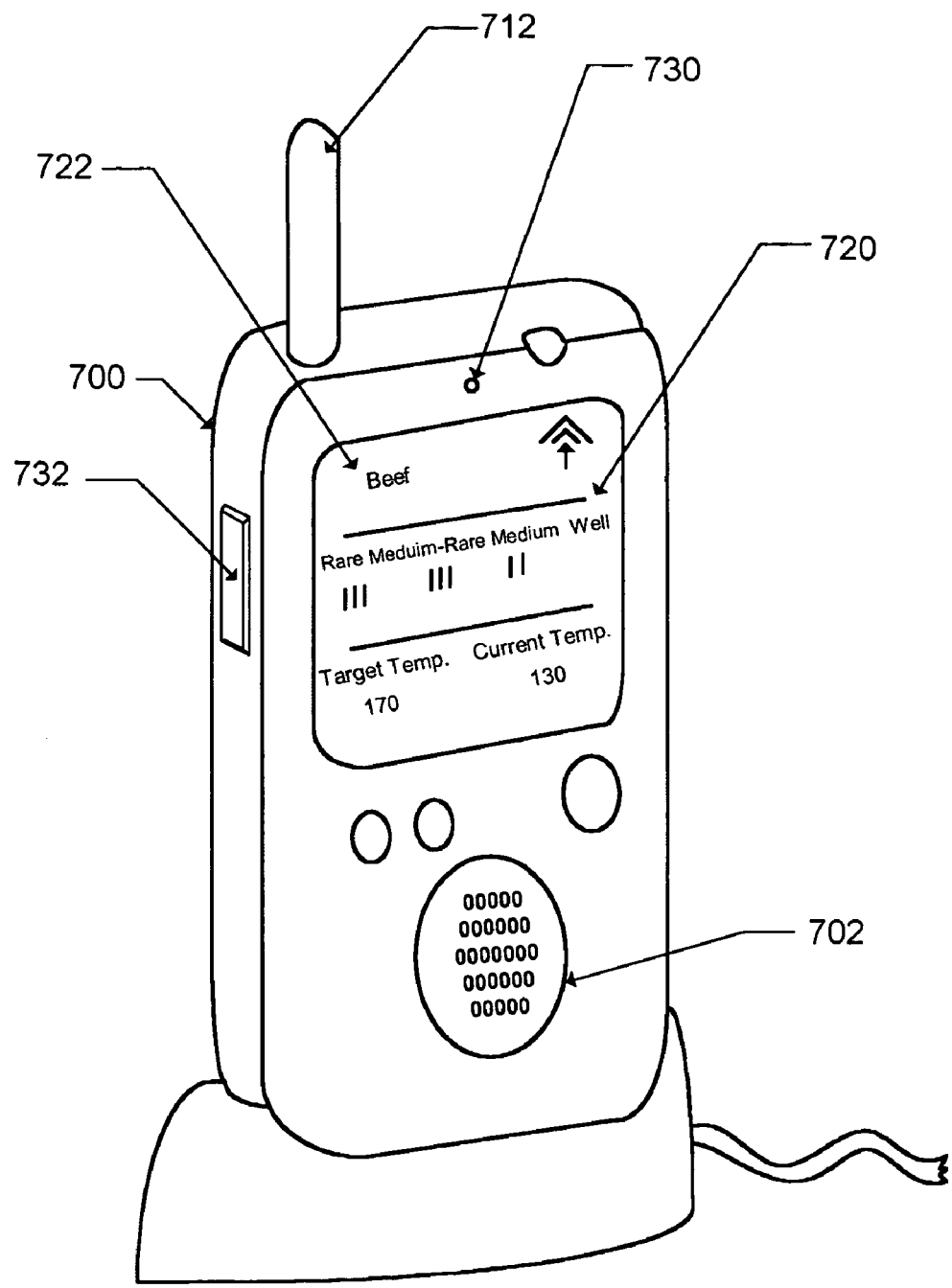
FIG. 7 is a perspective view of the monitor, in accordance with a second exemplary embodiment of the invention.
Figure 8:
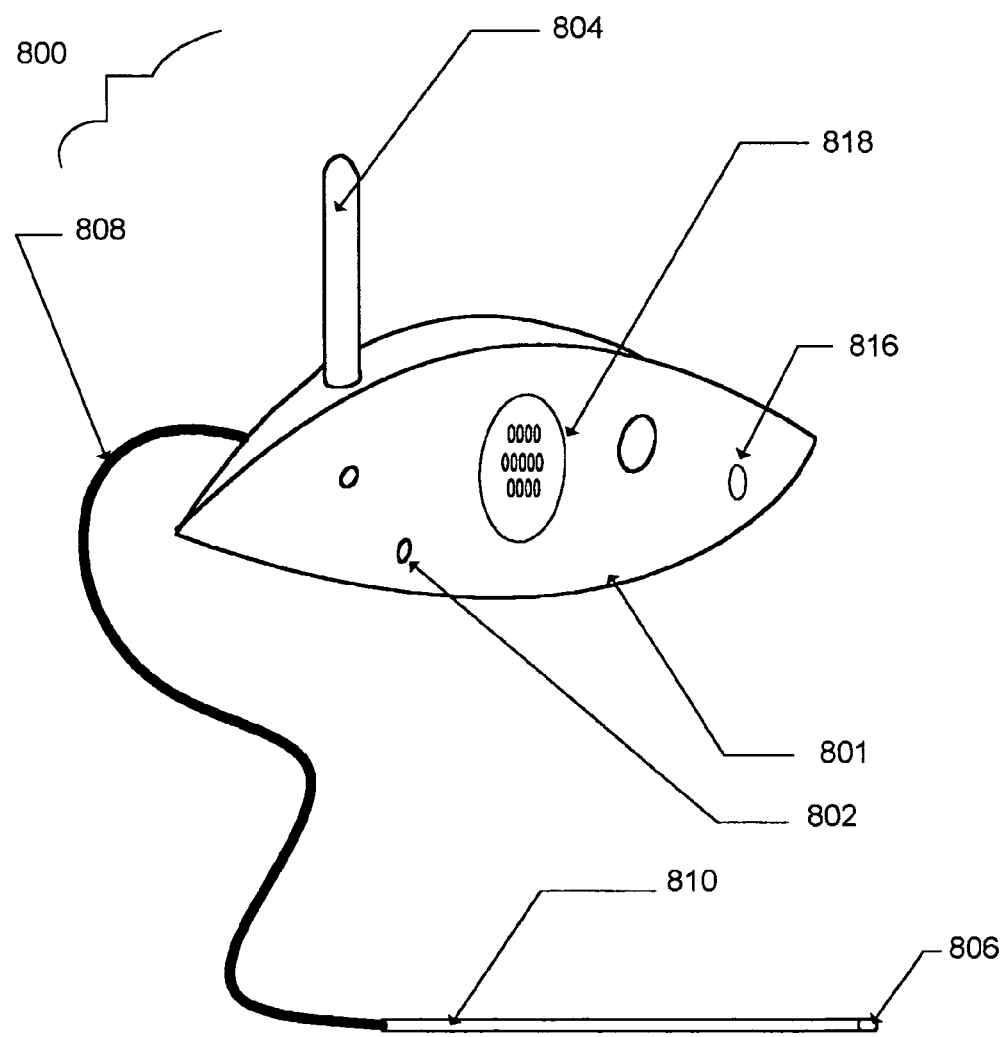
FIG. 8 is a perspective view of the temperature sensor assembly, in accordance with the second exemplary embodiment of the invention.

FIG. 7 is a perspective view of a monitor 700 and FIG. 8 is a perspective view of a temperature sensor assembly 800, in accordance with a second exemplary embodiment. The temperature sensor assembly 800 measures the temperature of a food item and transmits the measured temperature to the monitor 700. In accordance with the second exemplary embodiment, the temperature sensor assembly 800 also has a microphone 802 for receiving audio to be transmitted to the monitor 700 for broadcast by a speaker 702 of the monitor 700. Additionally, in accordance with the second exemplary embodiment, the monitor 700 has a microphone 730 for receiving audio to be transmitted to the temperature sensor assembly 800 for broadcast by a speaker 818 of the temperature sensor assembly 800.

The monitor 700 has an antenna 712 for transmitting and receiving wireless signals from the temperature sensor assembly 800. The antenna 712 of the monitor 700 receives the wireless transmission and converts it to an electrical signal that is guided within a wire, which in turn is fed to control circuitry 912 (FIG. 9) of the monitor 700. The antenna 712 of the monitor 700 can also receive an electrical signal from the control circuitry 912 (FIG. 9) of the monitor 700 and transmit the signal to the temperature sensor assembly 800. The control circuitry 912 (FIG. 9) is described in greater detail in the specification associated with FIG. 9. The antenna 804 of the temperature sensor assembly 800 receives the wireless transmission. In the second exemplary embodiment described above, the antenna 804 of the temperature assembly 800 can transmit and receive wireless signals from the antenna 712 of the monitor 700 at a distance of three hundred (300) feet, however, different transceivers can be provided to increase or decrease the transmission distance.

The temperature sensor assembly 800 measures the temperature of a food item and transmits the measured temperature to the monitor 700. The temperature sensor assembly 800 has the ability to transmit audio to the monitor 700 for broadcast by a speaker 702 of the monitor 700. In addition, the temperature sensor assembly 800 has the ability to receive audio from the monitor 700 for broadcast by the speaker 818 of the temperature sensor assembly 800.

A temperature sensor 806 is coupled to the temperature sensor base 801 by a cable 808. The temperature sensor 806 is integrated within a piercing element 810. The piercing element 810 is designed for insertion into food and made of a metal or other material that provides structure and thermal conductivity. The temperature sensor 806 can be a thermocouple or other device that changes the current or voltage as temperature increases or decreases. The cable 808 transmits the change in current or voltage back to the temperature sensor base 801. The temperature sensor assembly 800 then transmits the change in current or voltage to the antenna 804 for wireless transmission to the monitor 700. Alternatively, the temperature sensor 806 may not be connected to the temperature sensor base 801, but instead, be capable of transmitting change in current or voltage back to the temperature sensor base 801.

The temperature sensor assembly 800 has the microphone 802 and the speaker 818 located on the surface of the temperature sensor base 801. A microphone key button 816 allows the user to operate the microphone 802. The user operates the microphone 802 by pressing the microphone key button 816 and speaking into the microphone 802. The speech of the user is converted into an audio signal that is transmitted to the antenna 804 for wireless transmission. The audio signal is then transmitted wirelessly to the antenna 712 of the monitor 700. The monitor 700 broadcasts the audio signal out of the speaker 702 located on the surface of the monitor 700. This allows the user located near the temperature sensor assembly 800 to communicate to an individual near or within hearing distance of the monitor 700.

The monitor 700 has the microphone 730 and the speaker 702 located on the surface of the monitor 700. A microphone key button 732 on a surface of the monitor 700 allows the user to operate the microphone 730. The user operates the microphone 730 by pressing the microphone key button 732 and speaking into the microphone 730. The speech of the user is converted into an audio signal that is transmitted to the antenna 712 of the monitor 700 for wireless transmission. The audio signal is then transmitted wirelessly to the antenna 804 of the temperature sensor assembly 800. The temperature sensor assembly 800 broadcasts the audio signal out of the speaker 818 located on the surface of the temperature sensor assembly 800. This allows an individual using the monitor 700 to communicate to the user located near the food being monitored by the temperature sensor assembly 800.

FIG. 9 is a block diagram illustrating the interaction of components of a food monitoring assembly 900, containing the temperature sensor assembly 800 and the monitor 700 in accordance with the second exemplary embodiment of the invention. The control circuitry 902 of the temperature sensor assembly 800 receives signals from the temperature sensor 904 and the microphone 906. The control circuitry 902 transmits the received signals to a transceiver 908 that transmits the signal via the antenna 804 of the temperature sensor assembly 800. The wireless signal is broadcasted from the antenna 804 of the temperature sensor assembly 800 and is received by the antenna 712 of the monitor 700. The transceiver 908 of the temperature sensor assembly 800 can also receive audio signals that have been transmitted from the antenna 712 of the monitor 700. The control circuitry 902 of the temperature sensor assembly 800 broadcasts the received audio signal out of the speaker 909 of the temperature sensor assembly 800.

The control circuitry 912 of the monitor 700 receives the signal from the transceiver 910 of the monitor 700. The control circuitry 902, 912 of both the monitor 700 and the temperature sensor assembly 800 may be implemented entirely in hardware, as discussed in the first exemplary embodiment. Alternatively, functionality provided by the control circuitry may be provided via software. The monitor 700 may have a storage device 914 therein and peripheral devices. In the second exemplary embodiment the peripheral devices may include a variety of buttons 916 and a display 918.

The control circuitry 912 of the monitor 700 transmits the audio signals received from the transceiver 910 to a speaker 920 that broadcasts the audio signals to the user. When the control circuitry 912 of the monitor 700 receives information concerning the temperature of the food item, the control circuitry 912 compares the temperature of the food item with a stored doneness chart 720 that is specific to the food item 722 selected by the user. The different doneness charts 720 are stored in the storage device 914 of the monitor 700. The control circuitry 912 determines the current temperature range of the food item. The control circuitry 912 of the monitor 700 displays the specified number of bars for the identified range. In addition to storing the various doneness charts 722, the storage device 914 of the monitor 700 can be used to store various temperature settings and alarms. For example, the monitor 700 can be set to sound an audible or visual alarm when the food item has reached a specified temperature saved in storage 914. In addition to the doneness charts and alarms, other features described in the first exemplary embodiment may be incorporated in the second exemplary embodiment and stored in the storage device 914.

In addition to receiving and broadcasting audio transmitted from the temperature sensor assembly, the control circuitry 912 of the monitor 700 can also receive signals from the microphone 922 of the monitor 700. The control circuitry 912 transmits the received signals to the transceiver 910 that transmits the signal via the antenna 712 of the monitor 700. The wireless signal is broadcasted from the antenna 712 of the monitor 700 and received by the antenna 804 of the temperature sensor assembly 800. The transceiver 908 of the temperature sensor assembly 800 receives audio signals that have been transmitted from the antenna 712 of the monitor 700. The control circuitry 902 of the temperature sensor assembly 800 broadcasts the received audio signals out of the speaker 909 of the temperature sensor assembly 800.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for monitoring food, the apparatus comprising:
    a piercing element with a temperature sensor;
    a temperature sensor base having a transmitter and a microphone wherein the temperature sensor base is electrically coupled to the temperature sensor; and
    a monitor having a speaker and a receiver for communicating with the transmitter of the temperature sensor base,
    wherein the transmitter of the temperature sensor base transmits a temperature sensed by the temperature sensor and an audio signal produced by the microphone.

2. The apparatus of claim 1, further comprising the monitor having a display, whereby the temperature sensed by the temperature sensor and a target temperature are shown on the display.

3. The apparatus of claim 1, further comprising the monitor having control circuitry operatively associated with the monitor wherein the control circuitry is responsive to the temperature sensed by the temperature sensor and an audio signal produced by the microphone.

4. The apparatus of claim 1, wherein the transmitter of the temperature sensor base transmits a temperature sensed by the temperature sensor at a first frequency range and transmits an audio signal produced by the microphone at a second frequency range.

5. The apparatus of claim 1, wherein the speaker of the monitor broadcasts the temperature sensed by the temperature sensor.

6. The apparatus of claim 1, wherein the speaker of the monitor broadcasts a doneness scale containing multiple stages of doneness.

7. The apparatus of claim 1, further comprising the temperature sensor base having a receiver and a speaker; and the monitor having a transmitter and a microphone wherein the transmitter of the monitor transmits an audio signal produced by the microphone of the monitor.

8. The apparatus of claim 7, further comprising the temperature sensor base having control circuitry operatively associated with the temperature sensor base wherein the control circuitry is responsive to the temperature sensed by the temperature sensor and an audio signal produced by the microphone of the temperature sensor base.

9. The apparatus of claim 1, further comprising the monitor having a display, whereby the temperature sensed by the temperature sensor is displayed by the display.

10. The apparatus of claim 9, wherein the display includes a doneness scale containing multiple stages of doneness.

11. The apparatus of claim 9, further comprising the monitor having one or more buttons used to scroll through a set of options on the display.

12. A method for monitoring food by a temperature sensor base, comprising the steps of:
    inserting a temperature sensor into the food;
    sensing a temperature with the temperature sensor electrically coupled to the temperature sensor base;
    transmitting the temperature to a monitor with a transmitter on the temperature sensor base; and
    transmitting a first audio signal to the monitor with the transmitter of the temperature sensor base.

13. The method of claim 12, further comprising the steps of:
    broadcasting over a speaker of the monitor the first audio signal received by the monitor; and
    displaying the temperature received by the monitor.

14. The method of claim 13, further comprising the steps of:
    transmitting a second audio signal to the temperature sensor base using a transmitter of the monitor and
    broadcasting over a speaker of the temperature base the second audio signal received by the temperature sensor base.

15. A system for monitoring food by a temperature sensor base, comprising:
    means for sensing a temperature with a temperature sensor electrically coupled to the temperature sensor base;
    means for inserting the means for sensing into the food; and
    means for transmitting the temperature and a first audio signal to a monitor.

16. The system of claim 15, further comprising:
    means for broadcasting the first audio signal by the monitor, and
    means for displaying the temperature by the monitor.

17. The system of claim 16, further comprising:
    means for transmitting a second audio signal to the temperature sensor base by the monitor; and
    means for broadcasting the second audio signal by the temperature sensor base.

18. The system of claim 16, wherein the means for displaying includes a doneness scale containing multiple stages of doneness.

19. The system of claim 16, further comprising the monitor having a means for scrolling through a set of options on the means for displaying.

20. The system of claim 16, wherein the means for transmitting the temperature and a first audio signal transmits the temperature at a first frequency range and transmits the second audio signal at a second frequency range.

21. The system of claim 16, wherein the means for broadcasting broadcasts the temperature sensed.

22. An apparatus for monitoring food, the apparatus comprising:
- a piercing element with temperature sensor;
- a speaker;
- a receiver for communicating with a transmitter of a temperature sensor base, wherein the receiver of the apparatus receives a temperature sensed by the temperature sensor base from the temperature sensor and an audio signal produced by a microphone on the temperature sensor base;
- a transmitter; and
- a microphone wherein the transmitter of the apparatus transmits an audio signal produced by the microphone of the apparatus.

23. The apparatus of claim 22, wherein the temperature sensor base comprises:
- a speaker;
- a receiver for communicating with the transmitter of the apparatus, wherein the receiver of the temperature sensor base receives the audio signal produced by the microphone on the apparatus;
- a transmitter; and
- a microphone wherein the transmitter of the temperature sensor base transmits an audio signal produced by the microphone of the temperature sensor base.

* * * * *